Figure 1:
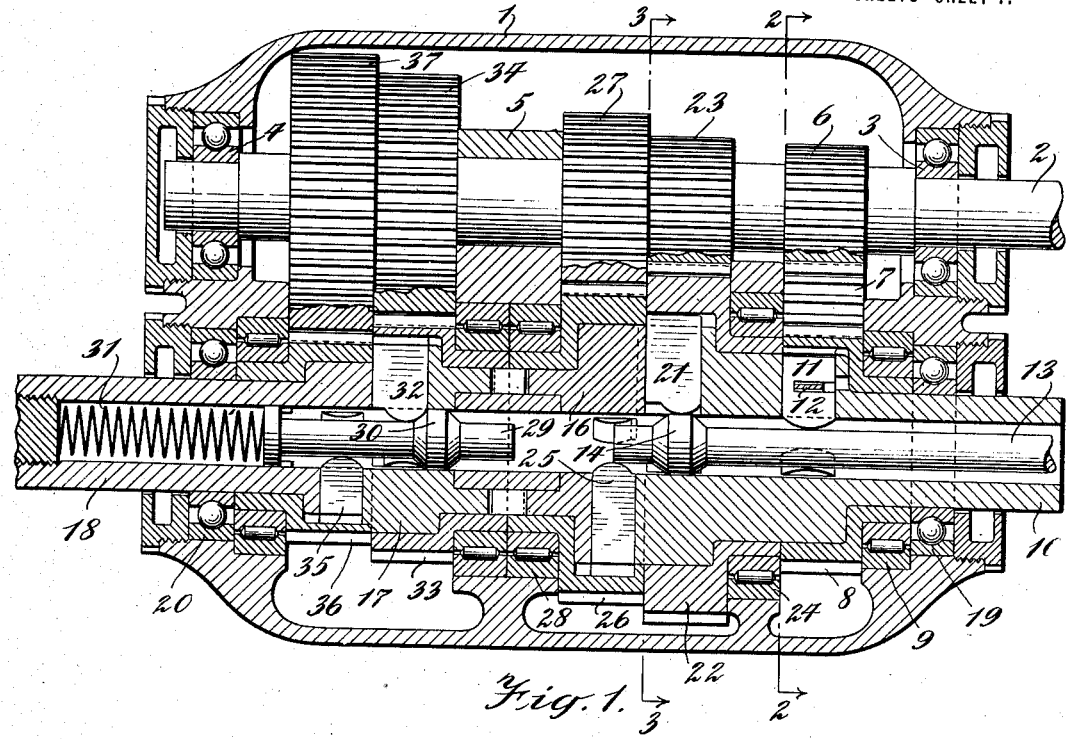

J. F. DEMARCHI.
TRANSMISSION GEARING.
APPLICATION FILED JAN. 20, 1915.

1,171,103.

Patented Feb. 8, 1916.
2 SHEETS—SHEET 1.

Witnesses:

Joseph F. Demarchi
Inventor

By his Attorney Lewis J. Doolittle

J. F. DEMARCHI.
TRANSMISSION GEARING.
APPLICATION FILED JAN. 20, 1915.

1,171,103.

Patented Feb. 8, 1916.
2 SHEETS—SHEET 2.

Witnesses:

Inventor
Joseph F. Demarchi
By his Attorney Lewis J. Doolittle

UNITED STATES PATENT OFFICE.

JOSEPH F. DEMARCHI, OF EAST ORANGE, NEW JERSEY.

TRANSMISSION-GEARING.

1,171,103.  Specification of Letters Patent.  Patented Feb. 8, 1916.

Application filed January 20, 1915. Serial No. 3,271.

*To all whom it may concern:*

Be it known that I, JOSEPH F. DEMARCHI, a citizen of the United States, and resident of East Orange, Essex county, New Jersey, have invented certain new and useful Improvements in Transmission - Gearing, of which the following is a specification.

This invention relates to a transmission gearing adapted for use in connection with power transmission devices or mechanisms where it is desired to transmit power from the motor while in operation.

An illustration of one of the many uses to which the invention may be put is in connection with the transmission of the power of an automobile engine to the driving wheels and one of the objects of this invention is to avoid the necessity of sliding the several gears through which the power is transmitted into mesh.

In carrying out the invention I provide several sets of gears between the engine shaft and the driving shaft which are in fixed position and always in mesh, which, consequently, may be constructed with a wider face, increasing their strength and wearing surfaces. Mechanism is provided for operatively connecting any one of the sets of gears with the driving shaft.

The above and other objects of the invention will appear more fully hereinafter in connection with the description of the embodiment of the same as shown in the accompanying drawings, in which like parts in the several views have been given the same reference numerals.

Figure 2:
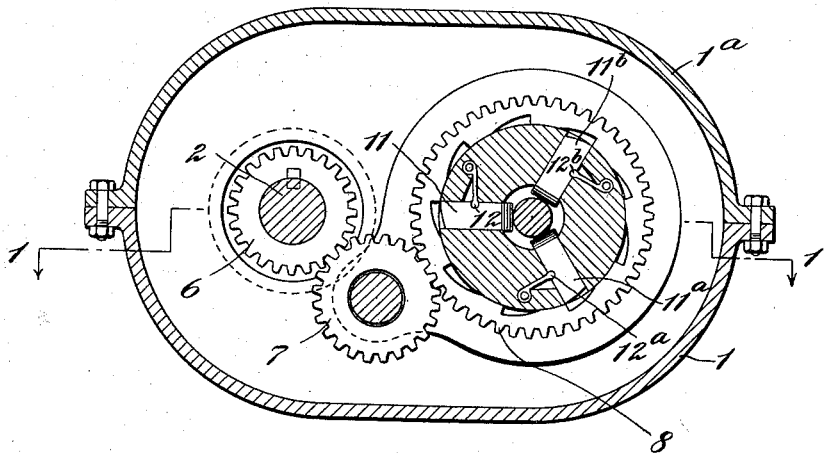
Figure 3:
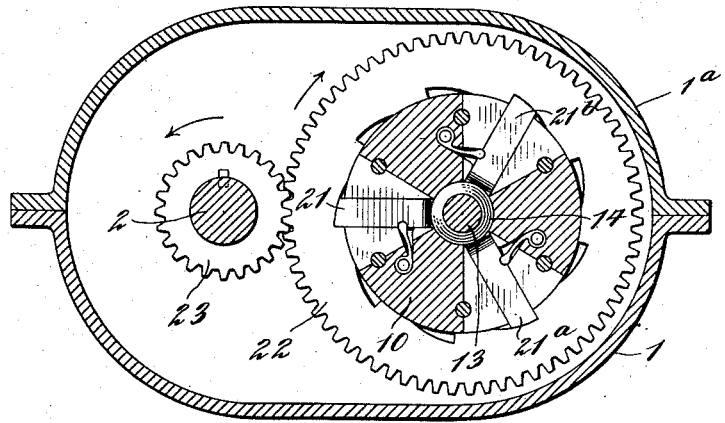
Figure 4:
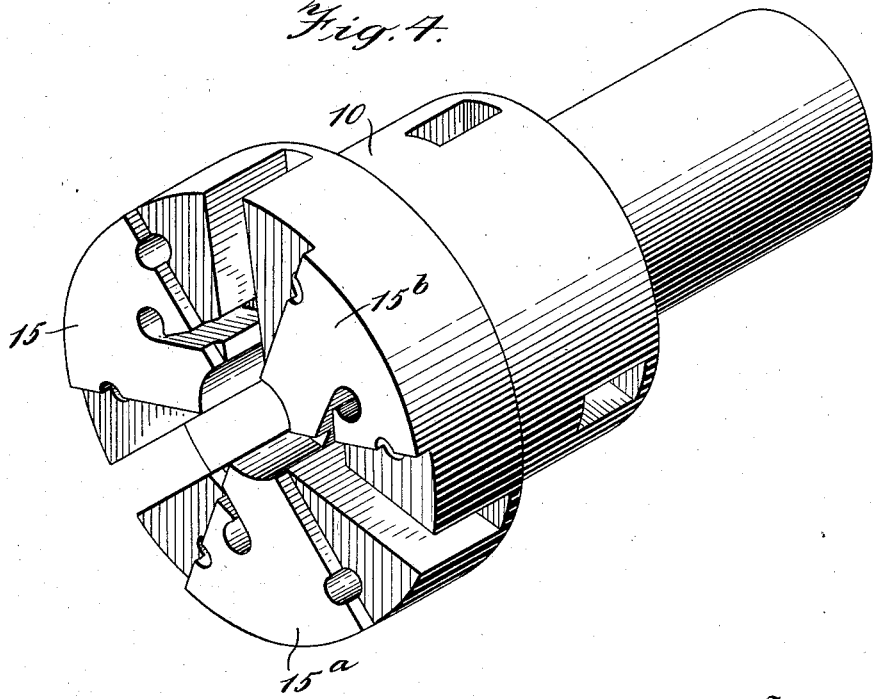

Figure 1 is a sectional plan view of a transmission gearing illustrating the invention, taken on the line 1—1 of Fig. 2. Fig. 2 is a sectional end elevation, taken on the line 2—2 of Fig. 1. Fig. 3 is a sectional end elevation, taken on the line 3—3 of Fig. 1. Fig. 4 is a perspective view of one of the operating parts of the driving mechanism.

The gearing is preferably mounted in an inclosing housing, which may be formed in two parts, such as 1 and 1ª, joined together on a horizontal plane through the center of the same. The engine shaft 2 is mounted in the casing and supported by suitable bearings at either end, such as 3 and 4, and may also be provided with an intermediate bearing 5.

The first set of gears, shown at the right of Fig. 1, is arranged to operate the driving shaft in the same direction as that of the engine shaft but at a reduced speed. In an automobile transmission this is the "reverse gear." This set of gears is composed of the gear 6, which is keyed to the engine shaft 2, an intermediate gear 7 and a large gear 8. The last mentioned gear 8 is mounted to rotate in a suitable bearing 9 carried by the housing 1 and surrounds the driving member 10, about which it revolves unless connected operatively therewith by means of the mechanism hereinafter described. The driving member 10 is shown in detail in Fig. 4.

Positioned in radial slots in the driving member 10 are a number of sliding pawls, 11, 11ª and 11ᵇ, which are normally held in their inner or inoperative position by means of the springs 12, 12ª, and 12ᵇ, respectively, these springs being positioned in recesses provided for the same in the driving member 10.

An operating member 13 is positioned to slide in a central opening in the driving member 10 and is operated by a suitable hand lever or other mechanism, not shown, in the usual manner. The operating member 13 is provided with an enlarged cam shaped portion 14 which, when moved to the right, from its position as shown in Fig. 1, engages the beveled inner ends of the pawls 11 and moves the same outwardly, causing their outer ends to engage with ratchet teeth on the inner surface of the gear 8. This positively and operatively connects gear 8 with the driving member 10, causing the same to be rotated therewith.

The inner end of the driving member 10 is provided with a number of projecting segments, such as 15, 15ª and 15ᵇ, and with correspondingly shaped recesses between the same, as shown in Fig. 4, which engage correspondingly shaped projections and recesses on an intermediate driving member 16, which abuts the same and which, in turn, is correspondingly engaged with a third driving member 17 and with a fourth driving member 18, which is connected with the mechanism to be driven. The forming of the driving members in the manner described, in several sections which are interlocked together, enables the same to be more readily assembled in the housing, after the pawls and other parts have been positioned therein. Suitable bearings, such as 19 and 20, are provided for the said driving members when assembled in the housing 1.

When the operating member 13 is moved to the position shown in Fig. 1, the cam shaped portion 14 thereof engages the inner ends of the pawls 21, 21ª and 21ᵇ, which pawls are mounted in slots in the driving member 10 in a similar manner to the pawls 12 just described. The pawls 21 are moved outwardly and engage with ratchet teeth on the interior of gear 22, which gear is in mesh with the gear 23 keyed to the engine shaft 2, as shown in Fig. 3. The gear 22 is mounted in a suitable bearing 24 in housing 1. The driving members 10, 16, 17 and 18 are now driven in the opposite direction from that just described in connection with the operation of the gears 6–8. The movement of the operating member 13 to the position shown in Fig. 1, releases the pawls 11 from the gear 8, the same being moved out of engagement with the ratchet teeth by means of springs 12, as will be readily understood by reference to Figs. 1 and 2. The further movement to the left of the operating member 13 causes the cam 14 to pass out of engagement with the pawls 21 and to engage with the pawls 25, which are similarly mounted in the driving member 16, and cause the same to engage the ratchet teeth on the inner side of the gear 26, which meshes with the gear 27 on the engine shaft 2, the gear 26 being mounted in a suitable bearing 28 in the housing 1. These gears 26 and 27, being proportioned in the proper relation for the second speed, cause the driving members 16, 17 and 18 to be driven at the desired speed from the engine shaft 2. The third set of gears may be brought into operation by the further movement of the operating member 13 to the left, when the inner end of the first part of the operating member 13 engages the end of a second part of the operating member 29, which is also provided with a cam shaped portion 30. This operating member 29 and its cam shaped portion 30 is then moved to the left against the spring 31 and operates pawls 32, which are mounted in the driving member 17, causing the same to engage with the ratchet teeth on the interior of the gear 33 which is in mesh with the gear 34 on the engine shaft 2.

The object of forming the operating member in two parts having lost motion therebetween is to shorten the travel of the first part of the operating member which would be necessary if it were to operate all of the sets of pawls. This makes it possible to shorten the gear case and provides a more compact arrangement. A further movement to the left of the operating members 13 and 29 causes the cam shaped portion 30 to release the pawls 32 and engage the pawls 35, which are similarly mounted in the driving member 18, which are then caused to engage with the ratchet teeth on the interior of gear 36, which meshes with the gear 37 on the engine shaft 2.

It is not thought to be necessary to describe in detail the construction and operation of all of the different sets of gears, as the construction and operation is similar to that described in connection with the first set, and it is believed the same will be readily understood by reference to the drawings. The number of different sets of gears used is determined by the number of different speed ratios desired between the engine shaft and driving members and it will be seen that, while all of the gears are constantly in mesh, it is only possible to place one set of gears in operative connection for driving and this is accomplished while all of the gears are being rotated in a simple and efficient manner.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. In a transmission gearing, in combination, a number of sets of gears adapted to operatively connect the motor shaft and the driving member, the gears of each set being always in mesh, a mechanism for each of said sets of gears adapted when operated to positively connect one of said sets of gears with the driving member, an operating member adapted to operate any one of said mechanisms, said operating member being formed in two parts having lost motion therebetween whereby one of the parts may be moved independently of the other part to operate certain of said mechanisms.

2. In a transmission gearing, in combination, a number of sets of gears adapted to operatively connect the motor shaft and the driving member, the gears of each set being always in mesh, a mechanism for each of said sets of gears adapted when operated to positively connect one of said sets of gears with the driving member, an operating member adapted to operate any one of said mechanisms, said operating member being formed in two parts having lost motion therebetween whereby one of the parts may be moved independently of the other part to operate certain of said mechanisms, the first mentioned part being adapted to move the second mentioned part in one direction, and a spring adapted to move the second mentioned part in the opposite direction.

3. In a transmission gearing, in combination, a motor shaft, a driving member having a central longitudinal opening and radial slots therein, a number of sets of gears adapted to operatively connect the motor shaft and driving member, the gears of each set being always in mesh, a set of pawls slidably mounted in such radial slots in the driving members adapted to move radially with respect to the driving member to engage ratchet teeth in one of the gears, and an operating member within the said central longitudinal opening adapted to engage and operate each of the said pawls.

4. In a transmission gearing, in combination, a casing, a motor shaft journaled therein, a hollow driving member divided longitudinally into a plurality of sections also journaled in the casing, a series of gears fixed upon the motor shaft, a corresponding series of gears loosely mounted upon the driving member and permanently in mesh with the gears on the motor shaft, anti-friction bearings mounted upon the housing and surrounding the said driving member in which said second mentioned series of gears are journaled, an operating member within the hollow driving member, and means operated by such member and extending outwardly through the driving member for effecting operative engagement between said driving member and second mentioned series of gears.

5. In a transmission gearing, in combination, a casing, a motor shaft journaled therein, a series of gears fixed upon the motor shaft, a driving member also journaled in the casing, said driving member being longitudinally divided into a number of interlocking sections, a second series of gears loosely mounted upon such driving member and meshing with the gears upon the motor shaft, and means for effecting driving connection between such driving member and the gears thereon.

Signed at the city, county and State of New York, this 5th day of Jan., 1915.

JOS. F. DEMARCHI.

Witnesses:
 LEWIS J. DOOLITTLE,
 WILLIS H. SIMPSON.